United States Patent [19]

Moulding et al.

[11] 4,394,043
[45] Jul. 19, 1983

[54] SUN VISOR

[75] Inventors: Michael B. Moulding, Hatfield Peverel, England; Klaus Müller, Weil-Haltingen; Gerhard Mack, Rheinfelden-Adelhausen, both of Fed. Rep. of Germany

[73] Assignee: Ford Motor Company, Dearborn, Mich.

[21] Appl. No.: 273,293

[22] Filed: Jun. 15, 1981

[51] Int. Cl.³ .............................................. B60J 3/00
[52] U.S. Cl. ................................ 296/97 H; 248/291; 296/97 K
[58] Field of Search ............... 296/97 R, 97 H, 97 K; 248/291

[56] References Cited

U.S. PATENT DOCUMENTS

| | | | |
|---|---|---|---|
| 2,223,845 | 12/1940 | Davies | 296/97 K |
| 4,130,317 | 12/1978 | Lai | 296/97 R |
| 4,148,519 | 4/1979 | Hollar | 296/97 H |

Primary Examiner—Joseph F. Peters, Jr.
Assistant Examiner—John A. Carroll
Attorney, Agent, or Firm—John J. Roethel; Daniel M. Stock; Clifford L. Sadler

[57] ABSTRACT

A sun visor for a motor vehicle comprises a mounting bracket having a shaft projecting therefrom. A visor panel is rotatably mounted on the shaft by a connector. A clip connected to the visor panel comprises a spring leaf which exerts a radial force on the shaft to resist rotation and a radial ridge formation which engages with a complementary groove formation on the shaft to resist axial movement of the panel along the shaft thereby avoiding the need for further fasteners.

6 Claims, 5 Drawing Figures

SUN VISOR

This invention relates to sun visors, in particular to sun visors for motor vehicles.

BACKGROUND OF THE INVENTION

One known type of sun visor widely used in motor vehicles comprises a mounting bracket having a longitudinally extending shaft projecting therefrom, a visor panel mounted on the shaft for rotation about the longitudinal axis of the shaft, and a mounting clip connected to the visor panel for rotation therewith and including a spring leaf which exerts a radial force on the shaft. The spring leaf resists rotation of the visor panel so that the visor panel can be arranged at a desired angle relative to the shaft. A flat portion is frequently provided on the shaft so that the spring leaf positively retains the visor panel in a position corresponding to that which the panel occupies in a vehicle when not in use. A sun visor having a construction of this type is for example disclosed in British Pat. No. 1,534,282.

In order to prevent the visor panel from moving axially relative to the shaft, it has been necessary to provide a further clip which has added to the cost of the part and has increased the complexity of its construction.

SUMMARY OF THE INVENTION

According to the present invention there is provided a sun visor comprising a mounting bracket having a longitudinally extending shaft projecting therefrom, a visor panel mounted on the shaft for rotation about the longitudinal axis of the shaft, and a mounting clip connected to the visor panel for rotation therewith and including a spring leaf which exerts a radial force on the shaft which resists rotation of the visor panel on the shaft, characterised in that the spring leaf and the shaft include complementary inter-engaging radial formations which engage each other to resist axial movement of the visor panel along the shaft.

The formations on the shaft and spring leaf thus enable the clip to perform the function of resisting both radial and axial movement of the visor panel relative to the shaft, thereby reducing the number of components in the sun visor, and facilitating its assembly.

Preferably, the formations comprise a groove and a ridge. This is most conveniently achieved by forming the groove circumferentially on the shaft, and forming the ridge in the spring leaf, for example in a pressing operation. For simplicity, the clip is preferably formed as one-piece pressing.

In order to retain the spring leaf in engagement with the shaft, the clip is preferably provided with one or more flanges having an aperture through which the shaft passes. These flanges can also be conveniently used to secure the clip to the visor panel by forming two arms in the or each flange, the panel being gripped between the two arms.

DESCRIPTION OF THE DRAWINGS

A preferred embodiment of the invention will now be described, by way of example only, with reference to the accompanying drawings, in which.

DETAILED DESCRIPTION OF THE INVENTION

Figure 1:
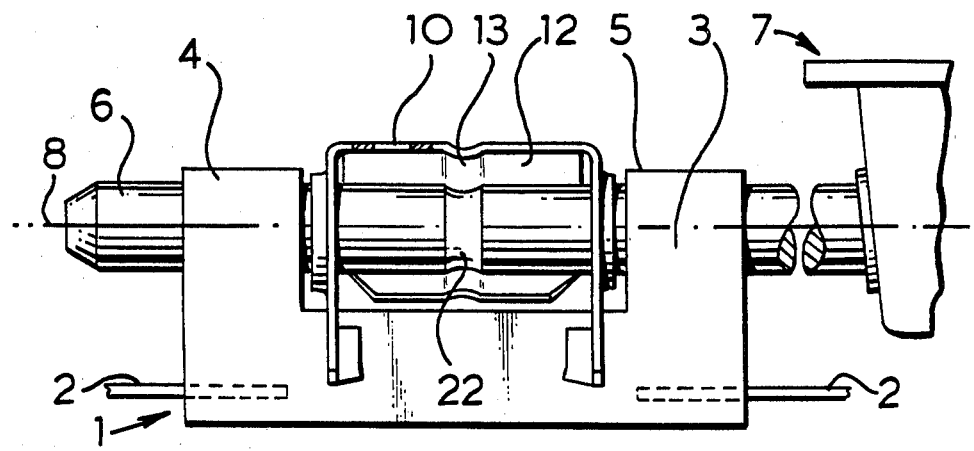
FIG. 1 is an elevation of part of a sun visor in accordance with the invention.

Referring to the drawings, a sun visor comprises a visor panel 1 of conventional construction which includes a peripheral wire frame 2 the ends of which are secured to a mounting block 3 which may be a block of moulded plastics material (as shown) or a metal stamping. The block 3 includes two aligned sleeve portions 4, 5 through which a longitudinally extending shaft 6 of a mounting bracket 7 extend and which allow the visor panel 1 to rotate about the longitudinal axis 8 of the shaft 6. A mounting clip 10 positioned between the two sleeve portions 4, 5 also connects the visor panel to the shaft 6.

Figure 2:
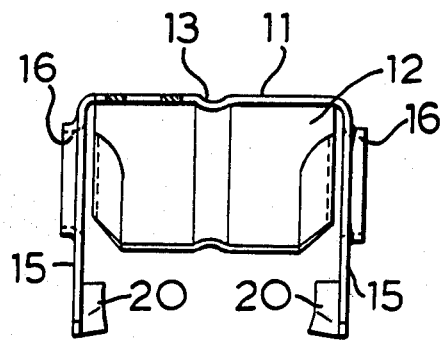
FIG. 2 is a similar view of a clip forming part of the sun visor of FIG. 1.
Figure 3:
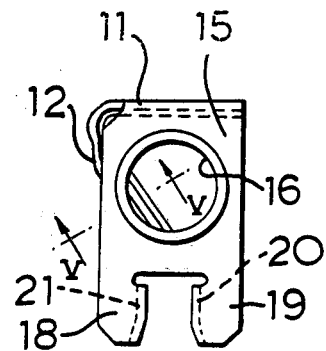
FIG. 3 is an end view of the clip of FIG. 2.
Figure 5:
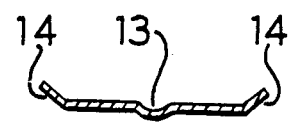
FIG. 5 is a cross-section, taken along line V—V of FIG. 3.

Referring to FIGS. 2 and 3, the clip 10 comprises an integral stamping of spring steel and has a longitudinally extending back plate 11 one side of which is bent over to form a spring leaf 12. The inside surfaces of the back plate 11 and the leaf spring 12 are formed with a continuous transverse ridge 13. The side edges 14 of the leaf spring 12 are swept back, as illustrated in FIG. 5.

Figure 4:
FIG. 4 is a side view, on a reduced scale, of a shaft forming part of the sun visor of FIG. 1.

The back plate 11 has two longitudinally spaced end flanges 15, 15. Each flange includes an aperture 16, large enough to receive the shaft 6 and two transversely spaced arms 18, 19. Each arm 18, 19 has a flange 20, 21 on its inner side which extends in the longitudinal direction. As seen in FIG. 3, the spring leaf 12 overlies the apertures 16, 16 and therefore engages the shaft 6 when the shaft is passed therethrough. Referring to FIG. 4, the shaft 6 has a circumferential groove 22 complementary in shape to the ridge 13, and a longitudinal extending flat portion 24 at one end. The terminal end 25 of the shaft 6 is tapered.

In order to assemble the sun visor, the clip 10 is connected to the block 3 by pushing the end flanges 15, 15 on to the block 3 so that the block 3 becomes firmly gripped between the inturned flanges 20, 21 on the inner sides of the arms 18, 19, and so that the apertures 16, 16 in the end flange 15, 15 are aligned coaxially with the sleeve portions 4, 5 of the block 3. The shaft 6 is then pushed through the sleeve portions 4, 5, and the apertures 16, 16 to deflect the spring leaf 12 radially outwardly until the transverse ridge 13 in the spring leaf 12 of the clip 10 engages in the groove 22 in the shaft 6. The insertion of the shaft 6 into the clip 10 is facilitated by its tapered end 25 and the inclined edges 14 of the spring leaf 12.

The engagement of the groove 22 and the ridge 13 resists further axial movement of the visor panel along the shaft 6 in either direction. The radial force exerted on the shaft 6 by the spring leaf 12 resists rotation of the visor panel on the shaft, and the engagement of the spring leaf 12 with the flat portion positively retains the panel in one rotational position relative to the shaft 6, corresponding to the position which the visor panel occupies when installed in a vehicle and not in use.

It is to be understood that this invention is not limited to the exact construction illustrated and described above, but that various changes and modifications may be made without departing from the spirit and scope of the invention as defined in the appended claims.

We claim:

1. A sun visor comprising a mounting bracket having a longitudinally extending shaft projecting therefrom, a visor panel mounted on the shaft for rotation about the longitudinal axis of the shaft, and a mounting clip connected to the visor panel for rotation therewith and including a spring leaf which exerts a radial force on the shaft which resists rotation of the visor panel on the shaft, characterized in that the spring leaf and the shaft include complementary interengaging radial formations which engage each other to resist axial movement of the visor panel along the shaft.

2. A sun visor according to claim 1, wherein the said formations comprise a groove and a ridge.

3. A sun visor according to claim 2, wherein the shaft includes a circumferential groove, and the spring leaf includes a ridge.

4. A sun visor according to claim 1, 2 or 3, wherein the clip is formed as an integral stamping.

5. A sun visor according to claim 4, wherein the clip includes one or more flanges having an aperture through which the shaft passes.

6. A sun visor according to claim 5, wherein at least one flange has two arms between which the visor panel is gripped.

* * * * *